(12) United States Patent
Hua et al.

(10) Patent No.: US 11,909,297 B2
(45) Date of Patent: Feb. 20, 2024

(54) FORCE-BALANCING MAGNETIC BEARING WITH ADJUSTABLE BIAS MAGNETIC FIELD FOR STATOR PERMANENT MAGNET MOTOR

(71) Applicant: SOUTHEAST UNIVERSITY, Nanjing (CN)

(72) Inventors: Wei Hua, Nanjing (CN); Zhiheng Zhang, Nanjing (CN); Qifan Xu, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 192 days.

(21) Appl. No.: 17/771,495

(22) PCT Filed: Nov. 29, 2021

(86) PCT No.: PCT/CN2021/133962
§ 371 (c)(1),
(2) Date: Apr. 25, 2022

(87) PCT Pub. No.: WO2022/222477
PCT Pub. Date: Oct. 27, 2022

(65) Prior Publication Data
US 2023/0155449 A1    May 18, 2023

(30) Foreign Application Priority Data
Apr. 22, 2021 (CN) .......................... 202110435872.0

(51) Int. Cl.
*H02K 7/09* (2006.01)
*F16C 32/04* (2006.01)
(52) U.S. Cl.
CPC ........... *H02K 7/09* (2013.01); *F16C 32/0465* (2013.01)

(58) Field of Classification Search
CPC ........ H02K 7/09; H02K 1/17; F16C 32/0465; F16C 32/0497; H02N 15/00
(Continued)

(56) References Cited

U.S. PATENT DOCUMENTS 10,749,423 B2 * 8/2020 Hakala ................. H02K 41/033
11,536,315 B2 * 12/2022 Hua ...................... F16C 32/0457
(Continued)

FOREIGN PATENT DOCUMENTS

CN          101581336 A      11/2009
CN          104201852 A      12/2014
(Continued)

*Primary Examiner* — Ahmed Elnakib
(74) *Attorney, Agent, or Firm* — Bayramoglu Law Offices LLC

(57) ABSTRACT

A force-balancing magnetic bearing with an adjustable bias magnetic field for a stator permanent magnet motor is provided. The force-balancing magnetic bearing includes four permanent magnetic poles and four electromagnetic poles, wherein a magnetic field energy of the four permanent magnetic poles is sourced from a stator permanent magnet of the stator permanent magnet motor, each permanent magnetic pole is formed by a left permanent-magnet magnetic bridge, a right permanent-magnet magnetic bridge, a magnetic adjusting section, an electromagnetic pole stator, an electromagnetic pole and permanent magnetic pole isolation plate, a permanent-magnet two-side magnetic pole connection section, a left permanent-magnet magnetic pole and a right permanent-magnet magnetic pole, a magnetic flux of each permanent magnetic pole is adjusted by the magnetic adjusting section, and the four electromagnetic poles are adjusted by currents introduced into electromagnetic pole winding coils.

13 Claims, 10 Drawing Sheets

(58) Field of Classification Search
USPC .......................................................... 310/90.5
See application file for complete search history.

(56) References Cited

U.S. PATENT DOCUMENTS

| | | |
|---|---|---|
| 2003/0001447 A1 | 1/2003 | Silber et al. |
| 2009/0091198 A1* | 4/2009 | Husband ............... H02K 21/44 |
| | | 310/46 |
| 2010/0072832 A1* | 3/2010 | Zhu ........................ H02K 21/44 |
| | | 310/49.46 |
| 2010/0109463 A1 | 5/2010 | Jiang et al. |
| 2017/0093231 A1* | 3/2017 | Laing ..................... H02K 21/12 |

FOREIGN PATENT DOCUMENTS

| | | |
|---|---|---|
| CN | 104283353 A | 1/2015 |
| CN | 108712043 A | 10/2018 |
| CN | 110848253 A | 2/2020 |
| CN | 109882425 B | 6/2020 |
| CN | 111425523 A | 7/2020 |
| CN | 111927885 A | 11/2020 |
| CN | 113285558 A | 8/2021 |
| JP | 2010106908 A | 5/2010 |

* cited by examiner

FORCE-BALANCING MAGNETIC BEARING WITH ADJUSTABLE BIAS MAGNETIC FIELD FOR STATOR PERMANENT MAGNET MOTOR

CROSS REFERENCE TO THE RELATED APPLICATIONS

This application is the national stage entry of International Application No. PCT/CN2021/133962, filed on Nov. 29, 2021, which is based upon and claims priority to Chinese Patent Application No. 202110435872.0 filed on Apr. 22, 2021, the entire contents of which are incorporated herein by reference.

TECHNICAL FIELD

Disclosed in the present disclosure is a force-balancing magnetic bearing with an adjustable bias magnetic field for a stator permanent magnet motor, which relates to the related technology in the field of electrical and mechanical transmission apparatuses, and belongs to the technical field of power generation, power transformation or power distribution.

BACKGROUND

The conventional stator permanent magnet motors include a doubly salient permanent magnet motor, a magnetic flux reverse permanent magnet motor and a magnetic flux switching permanent magnet motor, in which the permanent magnets are all located on the stators and no permanent magnet or winding is mounted on the rotators, so there is no risk that the permanent magnet of the conventional rotor permanent magnet motor is broken by centrifugal force and demagnetized at high temperature. However, the existing stator permanent magnet motor usually has a mechanical bearing, and the mechanical bearing is prone to high noise, high cost, fatigue failure and so on, which are often observed in the stator permanent magnet motor. Disclosed in a Chinese patent with the publication number of CN111425523A is a hybrid radial permanent magnet bias magnetic bearing, which uses a stator core of a traditional eight-pole motor as a main body structure of the magnetic bearing, with eight electromagnetic control magnetic poles and two permanent magnet bias magnetic poles, the static bearing capacity of the bearing is improved, the loss and the size are reduced, but the using effect of the bearing is likely to be influenced by the mounting angle and the mounting position, specifically, and the bearing can only be vertically mounted in the horizontal motor. Moreover, the permanent magnet bias magnetic circuit and the electromagnet magnetic circuit have a high coupling degree, and according to the principle of minimum reluctance, during practical application, the permanent magnetic field and the adjacent electromagnetic control magnetic poles are extremely likely to form a loop through the bias magnetic poles, causing the risk that the electromagnetic control magnetic poles cannot generate enough control force.

The axial force, a technical problem frequently faced by centrifugal fans, centrifugal impellers, etc., is closely related to apparatus manufacturing quality, liquid viscosity, rotation direction and mounting mode, the overlarge axial force can cause axial movement of the rotating shaft of the apparatus to cause bearing abrasion, motor rotor eccentricity and other problems, increasing maintenance difficulty and maintenance cost of the apparatus and reducing the service life and the production efficiency. The permanent magnet bias type radial magnetic bearing uses a permanent magnet material to generate a bias magnetic field, further generates the bias force to reduce the bias current of the conventional active type electrically-driven magnetic bearing, and is widely applied to vacuum apparatus manufacturing, compressors and other high-speed and vacuum fields because of the remarkable advantages of no contact, no lubrication and no abrasion.

With the emergence of permanent magnet bias type magnetic bearing products, the application research of the magnetic bearing has been firstly developed in the industries of vacuum apparatus manufacturing, compressors, etc., and a satisfactory effect has been achieved. Meanwhile, with the firm rotor structure and desirable operation performance, the stator permanent magnet motor is widely applied in the industry. Disclosed in a Chinese patent with the publication number of CN111927885A is a permanent magnet bias axial magnetic bearing. The magnetic bearing includes a first magnetic bearing stator assembly and a second magnetic bearing stator assembly symmetrically arranged on the two sides of the rotor, in this patent, separation of the electromagnetic flux and the permanent magnetic flux is achieved, power consumption of the magnetic bearing is reduced, and the dynamic response speed and the control precision of the magnetic bearing are improved. Chinese invention patents with application numbers of 201410594571.2 and 201410462477.1 provide abundant stator permanent magnet motor topological structures, widening the application field of the type of motor to a greater extent, and also providing abundant motor products for the industry.

Disclosed in a Chinese patent with the application number of 201910198690.9 are an axial force balancing and sealing structure and a high-power-density centrifugal fan, an axial force balancing disc and a sealing structure are integrally designed, which reduces the mass added to the output shaft, a three-layer sealing structure is designed, the axial force generated by the pressure difference counteracts part of the axial force generated by the impeller, but from the aspect of implementation, the structure still uses a passive axial force balance measure, and the system structure is complex. In the existing technology, balancing components such as a balancing disc, a wear-resisting plate and a balancing ring are commonly used in industry, a medium pumped by the apparatus generates a pressure difference on the two sides of the balancing component, part of axial force is balanced by using the pressure difference to weaken the adverse consequences caused by the axial force, however, the use of the balance component increases the complexity and axial length of the whole system, and the apparatus also faces the problems of increase of maintenance cost, reduction of system performance, etc. caused by abrasion of the balancing component.

In addition, the existing axial force balancing device, a permanent magnet bias type magnetic bearing and a stator permanent magnet motor are designed and machined as independent components and are assembled according to the required performance and design solution, so the compactness of the components is not high, and the size after assembly is larger. After mounted on the apparatus, the existing axial force balancing device usually cannot be adjusted according to the operation condition and the load change of the apparatus, and the balance potential of the axial force balancing device cannot be used to the maximum extent.

In conclusion, it is of important theoretical significance and application value to design a force-balancing magnetic bearing with an adjustable bias magnetic field for a stator permanent magnet motor for widening the use field of the stator permanent magnet motor and inspiring those skilled in the art to research into a structure compact type magnetic bearing motor system and a bias magnetic field adjustable type magnetic bearing.

SUMMARY

The objective of the present disclosure is to provide a force-balancing magnetic bearing with an adjustable bias magnetic field for a stator permanent magnet motor for overcoming the defects of the background technology, so as to improve compactness between a stator permanent magnet motor and a magnetic bearing, and to solve the technical problems that the pole number and strength of a permanent magnet bias magnetic field may not be adjusted and the structure is not compact after a conventional permanent magnet bias type magnetic bearing is mounted.

In order to achieve the above objective, the present invention uses the following technical solution:

A force-balancing magnetic bearing with an adjustable bias magnetic field for a stator permanent magnet motor is provided, a radial magnetic bearing consists of four permanent magnetic poles with adjustable bias magnetic fields and four electromagnetic poles, the eight magnetic poles are evenly distributed at an interval of 45° and are concentric with the motor, lower ends of the eight magnetic poles are arc surfaces, air gaps are reserved between the magnetic poles and a magnetic bearing rotor, the four electromagnetic poles are provided with electromagnetic pole winding coils, and the electromagnetic poles and the bias magnetic poles act together to keep the magnetic bearing rotor to suspend stably.

Preferably, the radial magnetic bearing is located on an inner side of an end of a stator winding coil and keeps a certain distance from a motor rotor in an axial direction, such that the bearing has the feature of being compact in structure.

Preferably, the radial magnetic bearing consists of permanent magnet sections axially longer than a stator core, left permanent-magnet magnetic bridges, right permanent-magnet magnetic bridges, magnetic adjusting sections, an electromagnetic pole stator, an electromagnetic pole and permanent magnetic pole isolation plate, permanent-magnet two-side magnetic pole connection sections, left permanent-magnet magnetic poles, right permanent-magnet magnetic poles, electromagnetic poles, electromagnetic pole winding coils, a first radial sensor, a second radial sensor and a magnetic bearing rotor.

Preferably, two sides of each permanent magnet section axially longer than a length of the stator core are provided with a set of magnetic bridges, lower portions of the set of magnetic bridges are connected to a left permanent-magnet magnetic pole and a right permanent-magnet magnetic pole respectively, each of the left permanent-magnet magnetic pole and the right permanent-magnet magnetic pole is of a two-segment structure, upper magnetic conduction sections are connected to the left permanent-magnet magnetic bridge and the right permanent-magnet magnetic bridge, and the above components are made of magnetic conduction materials and may lead out magnetic field energy of the permanent magnet sections axially longer than the length of the stator core.

Preferably, a magnetic adjusting section is arranged in the middle of each magnetic conduction section, is made of magnetic conduction materials, and adjusts a magnetic conductivity of the magnetic adjusting section or an embedded size of the magnetic conduction section to adjust a bias magnetic field, so as to adjust bias force.

Preferably, the permanent-magnet two-side magnetic pole connection section and the electromagnetic pole and permanent magnetic pole isolation plate integrally manufactured are arranged and are made of materials which are non-magnetic-conductive, low in conductivity and certain in strength and hardness, one side close to the magnetic conduction sections is provided with electromagnetic pole and permanent magnetic pole isolation plate recesses and electromagnetic pole and permanent magnetic pole isolation plate bosses, the recesses and the magnetic conduction sections have equal widths and depths, the bosses and the magnetic conduction sections have equal intervals, the magnetic conduction sections are embedded into the recesses, and the bosses are embedded between the magnetic conduction sections. One side away from the magnetic conduction sections is provided with electromagnetic pole and permanent magnetic pole isolation plate recesses, and electromagnetic pole stator bosses may be embedded therein. Meanwhile, the permanent-magnet two-side magnetic pole connection sections are embedded between the left permanent-magnet magnetic poles and the right permanent-magnet magnetic poles to form stable sandwich structures.

Preferably, the first radial sensor and the second radial sensor are arranged in centers of lower portions of the permanent-magnet two-side magnetic pole connection sections, are distributed at an interval of 90° and are configured to measure a radial position of the magnetic bearing rotor.

Preferably, electromagnetic pole stator bosses are arranged on one axial side of the electromagnetic pole stator and may be embedded into the electromagnetic pole and permanent magnetic pole isolation plate recesses, and the electromagnetic poles are provided with the electromagnetic pole winding coils.

An axial force and bias force-balancing axial magnetic bearing for a stator permanent magnet motor is provided, the axial magnetic bearing is of an eight-pole structure, electromagnetic force is provided by four internally grooved electromagnetic poles, and permanent magnet bias force is provided by four internally grooved permanent magnetic poles. The eight magnetic poles are evenly distributed at an interval of 45°, lower ends of the eight magnetic poles are arc surfaces, and the magnetic poles are preferably made of silicon steel sheets and other materials with desirable magnetic conductivity and low conductivity.

Preferably, a length $d_1$ of a rear air gap between the permanent magnetic pole and a thrust disc reinforcing member is equal to a length $d_2$ of a front air gap between the permanent magnetic pole and the thrust disc reinforcing member, and a length $w_1$ of a rear air gap between the permanent magnetic pole and a thrust disc and a length $w_2$ of a front air gap between the permanent magnetic pole and the thrust disc are adjustable and used for bias force adjustment.

Preferably, a length $d_3$ of a rear air gap between the electromagnetic pole and the thrust disc reinforcing member is equal to a length $d_4$ of a front air gap between the electromagnetic pole and the thrust disc reinforcing member, a length $w_3$ of a rear air gap between the electromagnetic pole and the thrust disc is equal to $d_1$, and a length $w_4$ of a front air gap between the electromagnetic pole and the thrust disc is equal to $d_2$. Further, $d_1$ is much larger than $w_1$, or $d_1$ is much larger than $w_2$, and a length $h_1$ of a rear air gap between the permanent magnetic pole and the thrust disc is equal to $d_1$.

Two thrust disc reinforcing members are arranged on two sides of the thrust disc for fastening the thrust disc, the thrust disc has an outer diameter larger than that of the thrust disc reinforcing members and an inner diameter equal to an outer diameter of a motor rotating shaft, is made of silicon steel sheets and other materials with desirable magnetic conductivity and low conductivity and may serve as an independent component or an integral component. When the thrust disc has an outer diameter smaller than the outer diameter of the motor rotating shaft and a larger axial length, the thrust disc reinforcing member may be omitted.

Preferably, two paths of permanent magnetic pole magnetic fluxes may be changed by means of the magnetic adjusting members, the two branch magnetic fluxes of the permanent magnetic pole magnetic fluxes may be adjusted by means of the air gap lengths w1 and w2, and the bias force of the axial magnetic bearing may be determined by the branch magnetic fluxes.

Preferably, the electromagnetic pole and permanent magnetic pole isolation plate are used to isolate the permanent magnetic pole magnetic flux and the electromagnetic pole magnetic flux, so as to reduce the coupling degree of the two magnetic fluxes.

Preferably, a magnetic conductivity of a magnetic adjusting member and an embedded size of the magnetic conduction sections are adjusted, relative distances between the thrust disc and a front permanent magnetic pole and a rear permanent magnetic pole are changed, then a cluster of bias force characteristic curves is obtained, and axial force of an apparatus during operation is computed according to a working mode, a load feature, a rotation direction and a mounting mode of the apparatus with the axial force, an optimal magnetic conductivity of the magnetic adjusting member, an optimal embedded size of the magnetic conduction sections and an optimal relative distance between the thrust disc and the front (or rear) permanent magnetic pole are set, the permanent magnetic poles are used to generate bias force equal to and opposite to the axial force of the apparatus, and when the bias force of the permanent magnetic poles is not enough to balance the axial force and the apparatus is disturbed by a load during dynamic operation to make the thrust disc deviate from a balance position, a current is introduced into the electromagnetic pole coils to generate electromagnetic force, and the electromagnetic force and the bias force of the permanent magnetic poles act together to balance the axial force. The present disclosure has the advantages of compact structure, high use degree of the permanent magnet bias magnetic field, low coupling degree of the permanent magnet flux and the electromagnetic flux, and convenience in control, and reduces the control current.

Compared with the prior art, the present disclosure has the significant advantages:

(1) A radial magnetic bearing with a compact structure and an adjustable bias magnetic field for a stator permanent magnet motor is designed, the radial magnetic bearing includes four permanent magnetic poles including permanent magnet sections axially longer than a stator core, left permanent-magnet magnetic bridges, right permanent-magnet magnetic bridges, magnetic adjusting sections, an electromagnetic pole stator, an electromagnetic pole and permanent magnetic pole isolation plate, permanent-magnet two-side magnetic pole connection sections, left permanent-magnet magnetic poles, right permanent-magnet magnetic poles, electromagnetic poles, electromagnetic pole winding coils, a first radial sensor, a second radial sensor and a magnetic bearing rotor, and four electromagnetic pole, where a magnetic flux of the permanent magnetic poles is adjusted by the magnetic adjusting sections, and the electromagnetic poles are adjusted by a current introduced into the electromagnetic pole winding coils; the recess and boss structures are reasonably arranged, and all components are reliably connected and have compact structures; and a common path of a permanent magnet bias magnetic flux and a electromagnetic pole magnetic flux is only the magnetic bearing rotor, and the permanent magnetic poles and the electromagnetic poles are isolated from each other by the permanent-magnet two-side magnetic pole connection sections and the electromagnetic pole and permanent magnetic pole isolation plate, that is, a coupling degree of the permanent magnet bias magnetic flux and the electromagnetic pole magnetic flux is low, such that the magnetic bearing can be controlled, and a compact structure and an adjustable bias magnetic field are achieved.

(2) A stator magnetic field of a stator permanent magnet motor is introduced into a magnetic suspension bearing, such that the feature of compact structure is achieved, an axial magnetic bearing formed by permanent magnetic poles and stator magnetic poles is designed, a magnetic conductivity of a magnetic adjusting member and an embedded size of the magnetic conduction sections are adjusted, relative distances (lengths of air gaps) between the thrust disc and the front permanent magnetic pole and the rear permanent magnetic pole are changed, then a cluster of bias force characteristic curves which may be looked up is obtained, an optimal magnetic conductivity of the magnetic adjusting member, an optimal embedded size of the magnetic conduction sections and an optimal relative distance between the thrust disc and the front (or rear) magnetic pole are set according to different working modes, load features, rotation directions and mounting modes of an apparatus with axial force, bias force of the permanent magnetic poles and electromagnetic force of the electromagnetic magnetic poles balance the axial force together, the feature of high use degree of a permanent magnet bias magnetic field is achieved, moreover, the permanent magnetic pole magnetic flux and the electromagnetic pole magnetic flux flow through different paths, and decoupling isolation of the permanent magnetic pole magnetic flux and the electromagnetic pole magnetic flux is achieved by means of the electromagnetic pole and permanent magnetic pole isolation plate, such that the present disclosure has the advantage of being convenient to control.

Figure 1A:
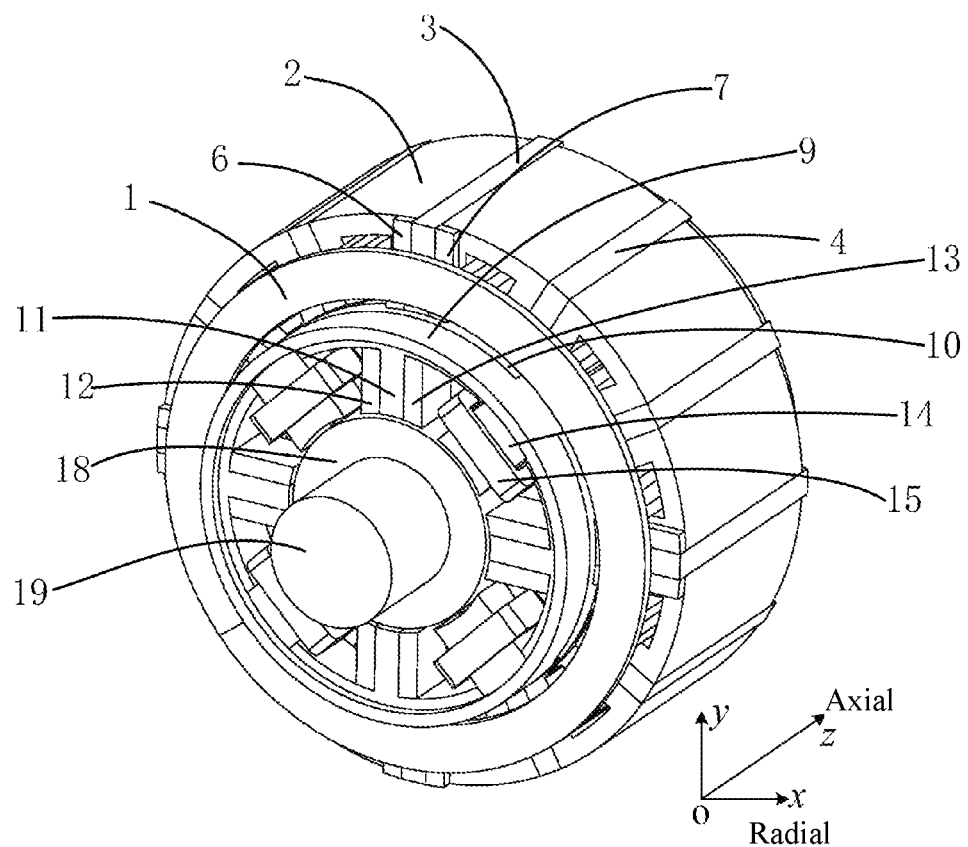
FIG. 1A is a structural diagram of a force-balancing radial magnetic bearing with an adjustable bias magnetic field for a stator permanent magnet motor mounted on the stator permanent magnet motor in Embodiment 1 of the present disclosure.

DESCRIPTION OF THE REFERENCE NUMERALS 1. stator winding coil end, 2. stator core, 3. permanent magnet axially longer than stator core, 301, 302, 303 and 304. permanent magnet section axially longer than stator core, 4. permanent magnet axially equal to stator core, 5. motor rotor, 6. left permanent-magnet magnetic bridge, 7. right permanent-magnet magnetic bridge, 8. magnetic adjusting section, 9. radial electromagnetic pole stator, 9a. electromagnetic pole stator boss, 10. electromagnetic pole and permanent magnetic pole isolation plate, 10a, 10c and 10d. electromagnetic pole and permanent magnetic pole isolation plate recess, 10b. electromagnetic pole and permanent magnetic pole isolation plate boss, 11. permanent-magnet two-side magnetic pole connection section, 12. left permanent-magnet magnetic pole, 13. right permanent-magnet magnetic pole, 12a and 13a. magnetic conduction section, 14. radial electromagnetic pole, 1401 and 1402. radial electromagnetic pole, 15. radial electromagnetic pole winding coil, 1501 and 1502. radial electromagnetic pole winding coil, 16. first radial sensor, 17. second radial sensor, 18. radial magnetic bearing rotor, 19. motor rotating shaft, 20. axial electromagnetic pole stator, 21. axial electromagnetic pole and permanent magnetic pole isolation plate, 22a. rear axial permanent-magnet two-side magnetic pole connector, 22b. front axial permanent-magnet two-side magnetic pole connector, 23. left permanent-magnet grooved magnetic pole, 24. right permanent-magnet grooved magnetic pole, 23a and 24a. magnetic conduction section, 25. first axial sensor, 26. second axial sensor, 27. axial electromagnetic pole winding coil, 28. axial electromagnetic pole, 28a and 28b. rear axial electromagnetic pole and front axial electromagnetic pole, 29. thrust disc reinforcing member, 30. thrust disc, 23b and 24b. rear axial permanent magnetic pole, and 23c and 24c. front axial permanent magnetic pole.

DETAILED DESCRIPTION OF THE EMBODIMENTS

In order to facilitate a detailed explanation of the present disclosure, an x-y-z reference coordinate system is established without loss of generality, an origin is o, a plane x-y is parallel to an end face of a cylindrical electric motor (that is, a cylinder bottom surface), a radius direction in the plane x-y is a radial direction, each end face circle is a circumferential direction, and z is an axial direction; meanwhile, one side of a component in the radial direction outward is defined as an "outer side", one side of the component in the radial direction inward is defined as an "inner side", one side of the component in the axial positive direction is defined as a "front side", and one side of the component in the axial negative direction is defined as a "rear side"; and the "left" and "right" of a reader define the "left" and "right" of the component when the reader faces the plane x-y.

The technical solution of the present disclosure will now be described in detail with reference to the accompanying drawings.

Figure 1B:
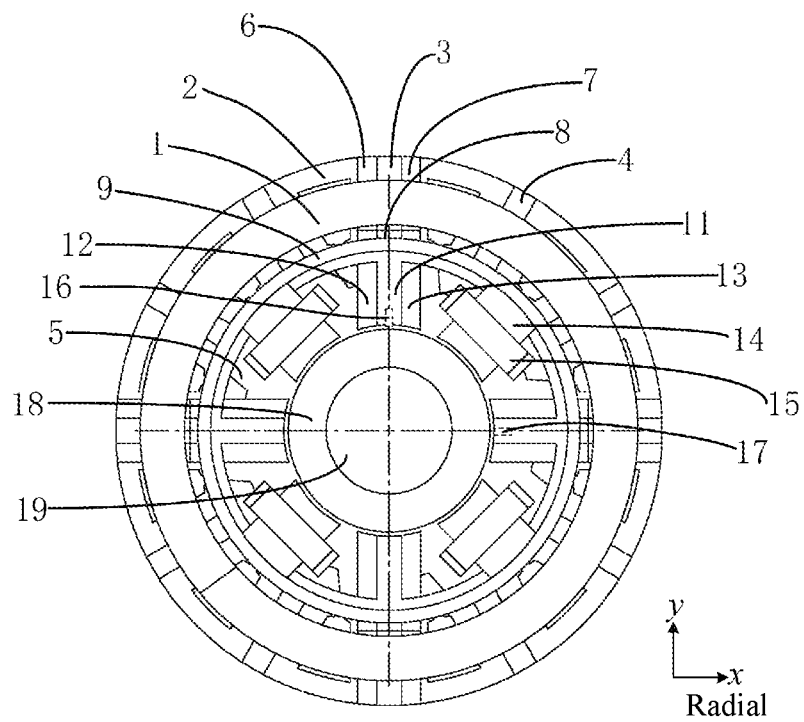
FIG. 1B is a front view of FIG. 1A.

Embodiment 1: Force-balancing radial magnetic bearing with adjustable bias magnetic field for stator permanent magnet motor As shown in FIGS. 1A and 1B, a force-balancing radial magnetic bearing with an adjustable bias magnetic field for a stator permanent magnet motor in Embodiment 1 of the present disclosure is mounted on a stator permanent magnet motor. A stator winding coil end 1, stator cores 2, a permanent magnet 3 axially longer than the stator cores, permanent magnets 4 axially equal to the stator cores, a motor rotor 5 and a motor rotating shaft 19 are components of the stator permanent magnet motor, and except for the permanent magnet 3 axially longer than the stator core, other components have dimensions, materials, and structures known to those skilled in the art. The stator cores 2 are evenly arranged in a circumferential direction of the motor, the permanent magnet 3 axially longer than the stator cores or the permanent magnet 4 axially equal to the stator cores is embedded between two adjacent stator cores 2, a coil is wound around each stator core 2, the coil wound around each stator core penetrates a motor groove to form the stator winding coil end 1, the motor rotor 5 is assembled on the motor rotating shaft 19 in an interference mode or a key groove mode, and an annular stator structure composed of the stator cores and the permanent magnets is assembled on an outer side of the motor rotor 5.

Figure 1C:
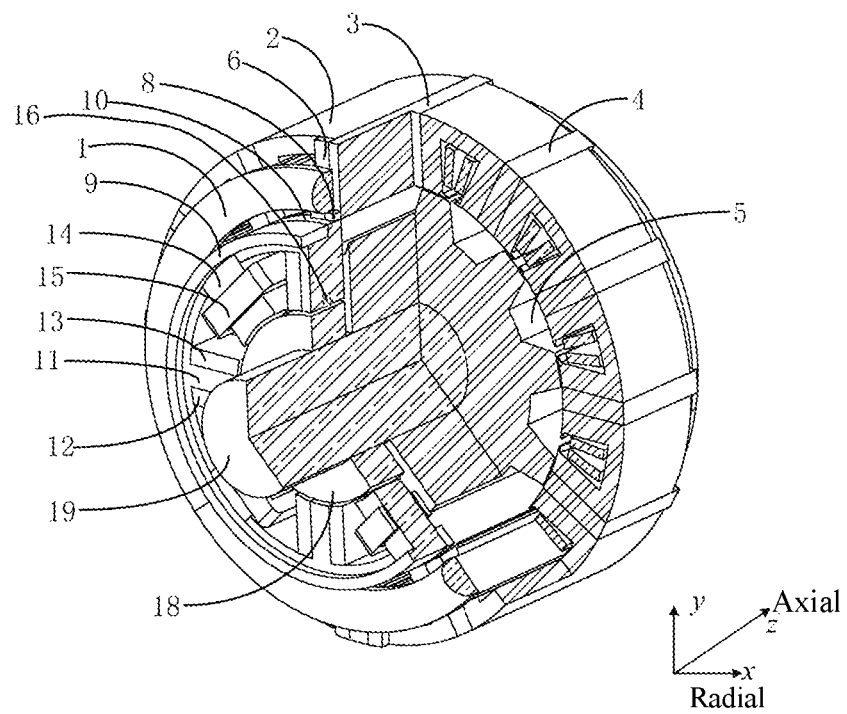
FIG. 1C is an axial half and circumferential one-third sectional view of FIG. 1A.
Figure 2A:
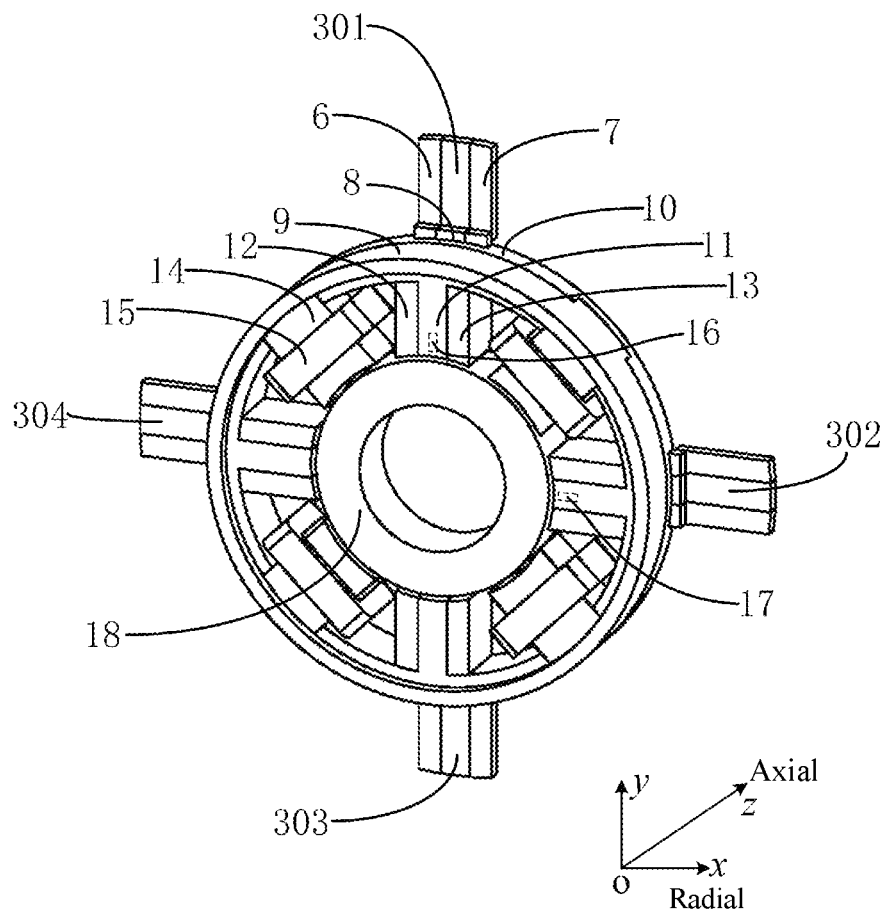
FIG. 2A is a structural diagram of the radial magnetic bearing in Embodiment 1 of the present disclosure.
Figure 2B:
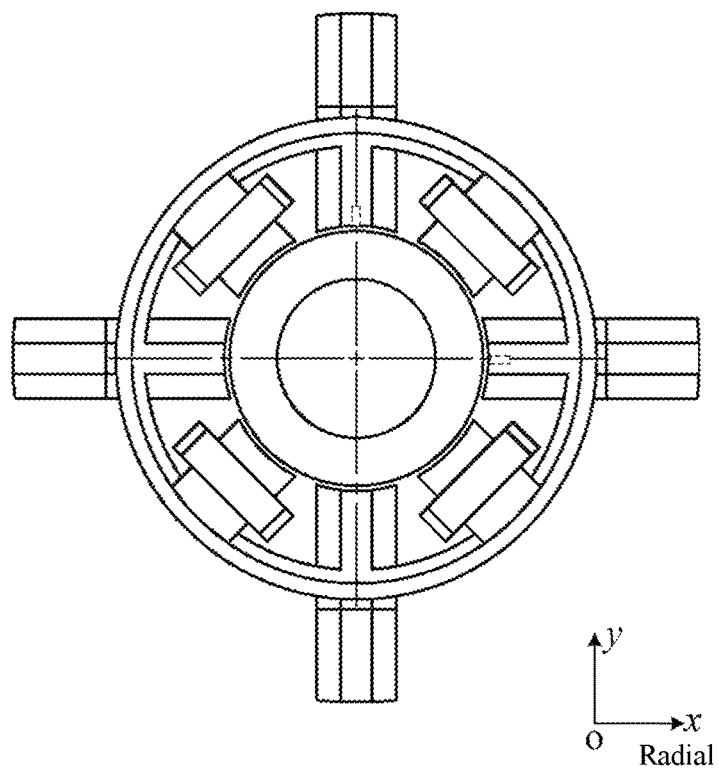
FIG. 2B is a front view of FIG. 2A.
Figure 2C:
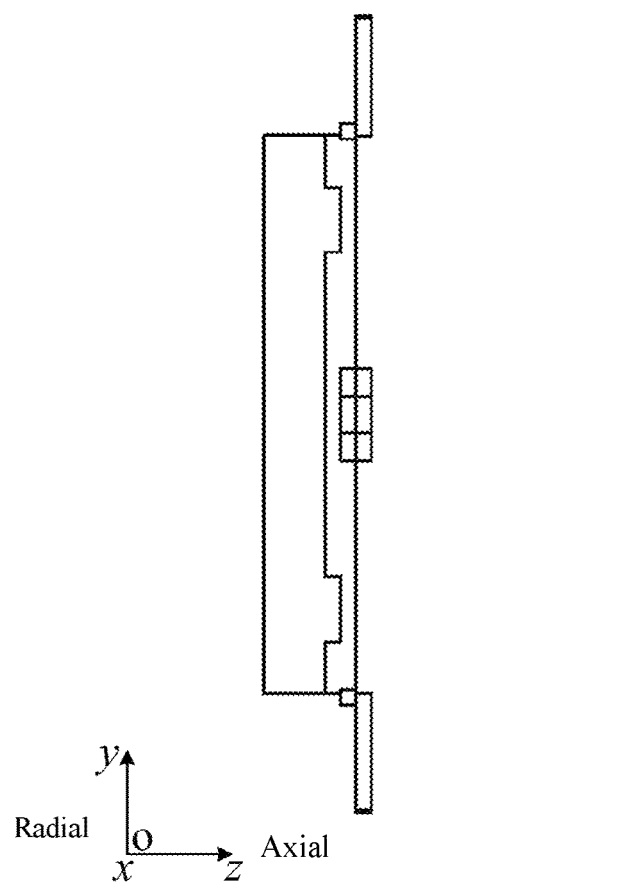
FIG. 2C is a side view of FIG. 2A.
Figure 2D:
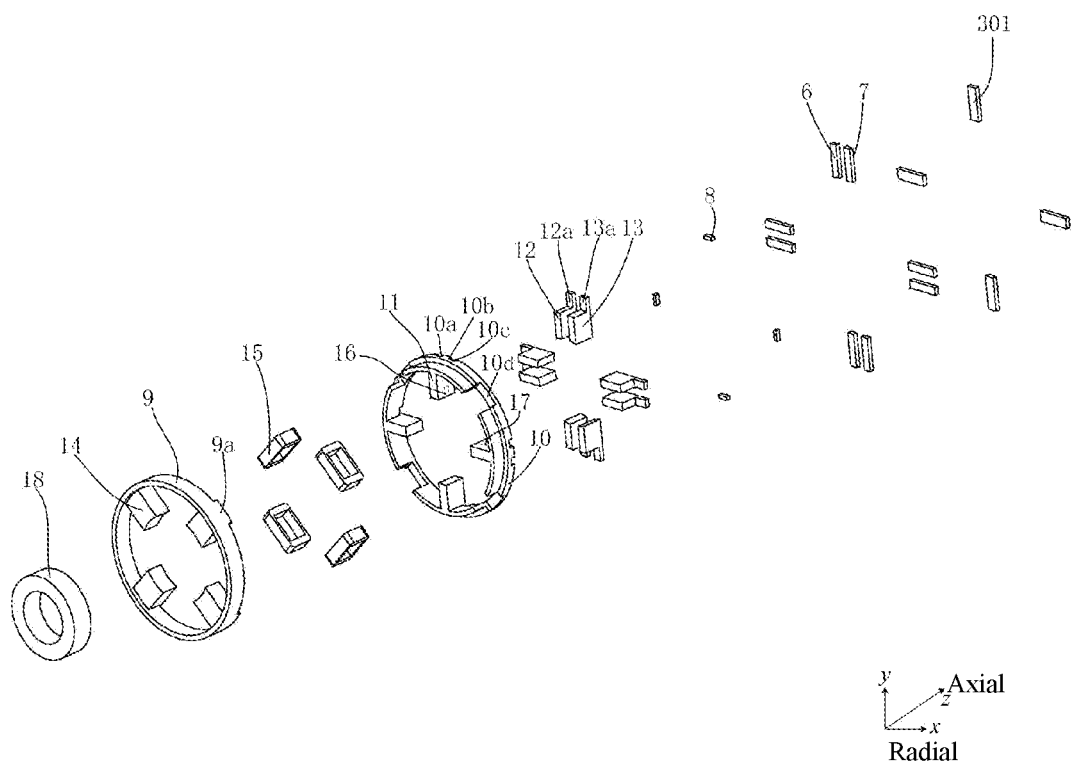
FIG. 2D is an exploded view of various components of FIG. 2A.

As shown in FIGS. 1A, 1B and 1C, the stator permanent magnet motor is totally provided with twelve stator permanent magnets which are evenly distributed at an interval of 30°, the stator permanent magnets may be made of one or more of ferrite, neodymium iron boron, samarium cobalt and other existing magnetic materials, a magnetizing direction (also called magnetization direction and polarization direction) is tangential, the magnetizing directions of two adjacent stator permanent magnets are opposite; the stator permanent magnets include four permanent magnets 3 axially longer than the stator cores and eight permanent magnets 4 axially equal to the stator cores, axial lengths of the permanent magnets 3 axially longer than the stator cores are larger than that of the stator cores 2, a single-side extension length is about 5% of the length of the stator cores, and the four permanent magnets are arranged on an upper side, a lower side, a left side and a right side separately and are symmetrically distributed at an interval of 90°; and axial lengths of the permanent magnets 4 axially equal to the stator cores are equal to that of the stator cores 2, and the permanent magnets are symmetrically distributed in four areas divided by the four permanent magnets 3 axially longer than the stator cores. Permanent magnet sections axially longer than the stator cores, left permanent-magnet magnetic bridges 6, right permanent-magnet magnetic bridges 7, the magnetic adjusting sections 8, a radial electromagnetic pole stator 9, an electromagnetic pole and permanent magnetic pole isolation plate 10, permanent-magnet two-side magnetic pole connection sections 11, left permanent-magnet magnetic poles 12, right permanent-magnet magnetic poles 13, radial electromagnetic poles 14, radial electromagnetic pole winding coils 15, a first radial sensor 16, a second radial sensor 17 and a radial magnetic bearing rotor 18 belong to the radial magnetic bearing, and the radial magnetic bearing is located on an inner side of the stator winding coil end 1 and keeps a certain distance from the motor rotor 5 in the axial direction.

The radial magnetic bearing is shown in FIGS. 2A, 2B, 2C and 2D, and two sides of each of the permanent magnet section 301 axially longer than the stator cores, the permanent magnet section 302 axially longer than the stator cores, the permanent magnet section 303 axially longer than the stator cores and the permanent magnet section 304 axially longer than the stator cores are provided with a set of magnetic bridges, that is, the left permanent-magnet magnetic bridge 6 and the right permanent-magnet magnetic bridge 7, and the axial lengths of the components are identical. Lower portions of the left permanent-magnet magnetic bridges 6 and the right permanent-magnet magnetic bridges 7 are connected to the left permanent-magnet magnetic poles 12 and the right permanent-magnet magnetic poles 13 respectively, and each permanent magnet section axially longer than the stator cores, the left permanent-magnet magnetic bridges 6, the right permanent-magnet magnetic bridges 7, the left permanent-magnet magnetic poles 12 and the right permanent-magnet magnetic poles 13 are all made of materials with desirable magnetic conductivity. The left permanent-magnet magnetic poles 12 and the right permanent-magnet magnetic poles 13 are each of a two-section structure, upper ends of the left permanent-magnet magnetic poles 12 and the right permanent-magnet magnetic poles 13 are magnetic conduction sections 12a and 13a respectively, which are connected to the left permanent-magnet magnetic bridges 6 and the right permanent-magnet magnetic bridges 7. The magnetic adjusting sections 8 are arranged between the magnetic conduction sections 12a and the magnetic conduction sections 13a, the magnetic adjusting sections 8 are preferably made of magnetic conductive materials, and a bias magnetic field is adjusted by adjusting a magnetic conductivity of the magnetic adjusting sections 8 or an embedded size of the magnetic conduction sections 12a and 13a.

The permanent-magnet two-side magnetic pole connection sections 11 and the electromagnetic pole and permanent magnetic pole isolation plate 10 are integrated, and are preferably made of non-magnetic, low-conductivity materials with certain strength and hardness. Electromagnetic pole and permanent magnetic pole isolation plate recesses 10a, electromagnetic pole and permanent magnetic pole isolation plate recesses 10c and electromagnetic pole and permanent magnetic pole isolation plate bosses 10b are arranged on one side, close to the magnetic conduction sections 12a and 13a, of the electromagnetic pole and permanent magnetic pole isolation plate 10, the electromagnetic pole and permanent magnetic pole isolation plate recesses 10a, the electromagnetic pole and permanent magnetic pole isolation plate recesses 10c, the magnetic conduction sections 12a and 13a have equal widths and depths, a radian distance of the electromagnetic pole and permanent magnetic pole isolation plate bosses 10b in a circumferential direction is equal to a distance between the magnetic conduction sections 12a and 13a, the magnetic conduction sections 12a and 13a are embedded into the electromagnetic pole and permanent magnetic pole isolation plate recesses 10a and the electromagnetic pole and permanent magnetic pole isolation plate recesses 10c respectively, and the electromagnetic pole and permanent magnetic pole isolation plate bosses 10b are embedded between the magnetic conduction sections 12a and the magnetic conduction sections 13a. An electromagnetic pole and permanent magnetic pole isolation plate recess 10a, an electromagnetic pole and permanent magnetic pole isolation plate recess 10c and an electromagnetic pole and permanent magnetic pole isolation plate boss 10b form a mounting structure for a pair of magnetic conduction sections (magnetic conduction section 12a and magnetic conduction section 13a), the mounting structures for all pairs of magnetic conduction sections form the annular electromagnetic pole and permanent magnetic pole isolation plate 10, one permanent-magnet two-side magnetic pole connection section 11 is mounted on an axial rear side of the mounting structure for each pair of magnetic conduction sections, the permanent-magnet two-side magnetic pole connection sections 11 and the electromagnetic pole and permanent magnetic pole isolation plate 10 can be integrally formed, two permanent-magnet two-side magnetic pole connection sections 11 is an arc T-shaped permanent magnet, an electromagnetic pole and permanent magnetic pole isolation plate recess 10d is arranged between the adjacent permanent-magnet two-side magnetic pole connection sections 11, and electromagnetic pole stator bosses 9a may be embedded into the electromagnetic pole and permanent magnetic pole isolation plate recesses 10d. Meanwhile, the left permanent-magnet magnetic poles 12 and the right permanent-magnet magnetic poles 13 are embedded in the electromagnetic pole and permanent magnetic pole isolation plate recesses 10a and the electromagnetic pole and permanent magnetic pole isolation plate recesses 10c, then the permanent-magnet two-side magnetic pole connection sections 11 are embedded between the left permanent-magnet magnetic poles 12 and the right permanent-magnet magnetic poles 13 to form stable sandwich structures. By means of the above components and the preferable recess and boss structures, reliable connection between the components may be achieved.

As shown in FIGS. 2A-2D, the first radial sensor 16 and the second radial sensor 17 are arranged in centers of lower portions of the permanent-magnet two-side magnetic pole connection sections 11, the first radial sensor 16 and the second radial sensor 17 are distributed at an interval of 90°, are the prior art or existing products, and are configured to measure a radial position of the radial magnetic bearing rotor 18. The radial electromagnetic pole stator 9 and the radial electromagnetic poles 14 are integrated and made of materials with desirable magnetic conductivity, the four radial electromagnetic poles 14 are symmetrically distributed at an interval of 90°, electromagnetic pole stator bosses 9a are arranged on an axial front side of the radial electromagnetic pole stator 9, and the electromagnetic pole stator bosses 9a may be embedded in the electromagnetic pole and permanent magnetic pole isolation plate recesses 10d. A radial electromagnetic pole winding coil 15 is wound around each radial electromagnetic pole 14. It can be seen that the four radial electromagnetic poles 14 form a radial magnetic bearing electromagnetic pole with a compact structure and an adjustable bias magnetic field, the four permanent magnet sections axially longer than the stator cores, the magnetic bridges, the magnetic adjusting sections 8, the permanent-magnet two-side magnetic pole connection sections 11, the left permanent-magnet magnetic poles 12 and the right permanent-magnet magnetic poles 13 form a radial bias magnetic pole, the radial bias magnetic pole is of an eight-pole structure, the eight magnetic poles are evenly distributed at an interval of 45° and are concentric with the motor, lower ends of the eight magnetic poles are arc surfaces, and air gaps are reserved between the magnetic poles and the radial magnetic bearing rotor 18.

Figure 3A:
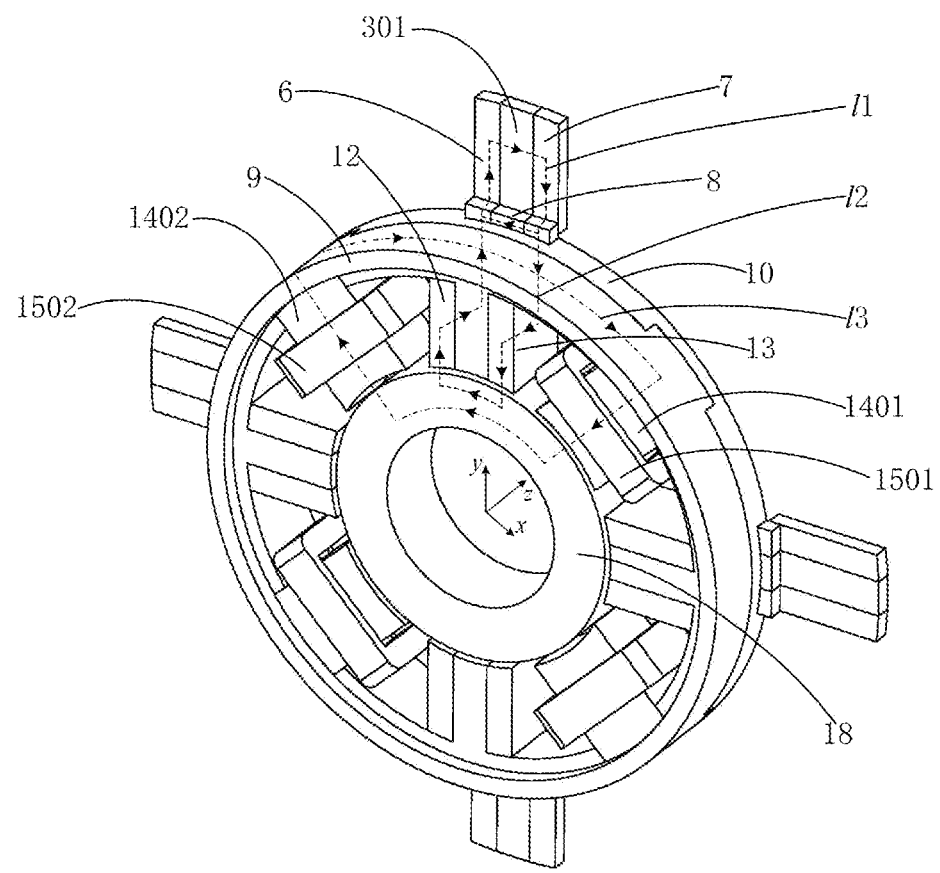
FIG. 3A is a schematic diagram of a permanent magnet bias magnetic flux and an electromagnetic pole magnetic flux in Embodiment 1 of the present disclosure.
Figure 3B:
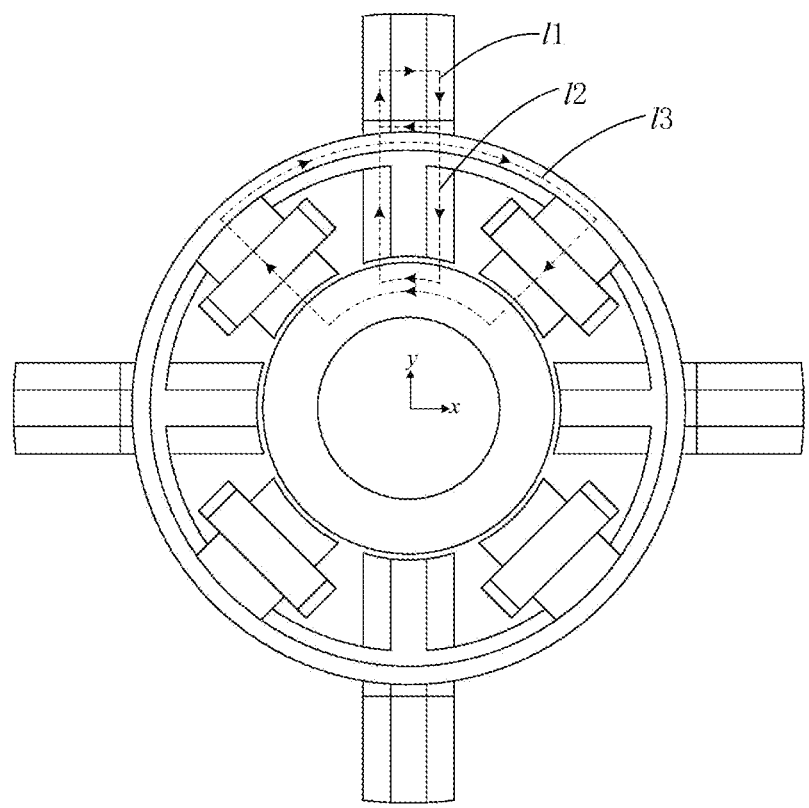
FIG. 3B is a front view of FIG. 3A.

Distribution of a permanent magnet bias magnetic flux and a radial electromagnetic pole magnetic flux is described in detail below in combination with FIGS. 3A-3B. For the permanent magnet section 301 axially longer than the stator cores, the permanent magnet bias magnetic flux 11 sequentially passes through the permanent magnet section 301 axially longer than the stator cores, the right permanent-magnet magnetic bridge 7, the magnetic conduction section 13a, the magnetic adjusting section 8, the magnetic conduction section 12a and the left permanent-magnet magnetic bridge 6, and the magnetic flux is essentially a short-circuit magnetic flux and does not generate bias force; and the permanent magnet bias magnetic flux 12 sequentially passes through the permanent magnet section 301 axially longer than the stator cores, the right permanent-magnet magnetic bridge 7, the magnetic conduction section 13a, the right permanent-magnet magnetic pole 13, an air gap between the right permanent-magnet magnetic pole 13 and the radial magnetic bearing rotor 18, the radial magnetic bearing rotor 18, an air gap between the left permanent-magnet magnetic pole 12 and the magnetic bearing rotor 18, the magnetic conduction section 12a and the left permanent-magnet magnetic bridge 6, the magnetic flux may generate bias force, such that the magnitude of the permanent magnet bias magnetic flux 11 and the magnitude of the permanent magnet bias magnetic flux 12 may be adjusted by adjusting the magnetic conductivity of the magnetic adjusting section 8 or an embedded size of the magnetic conduction sections 12a and 13a, so as to adjust the magnitude of the bias force. The bias force generated by the permanent magnet section 301 axially longer than the stator cores is in a positive direction of an Y axis, when the radial magnetic bearing rotor 18 is disturbed and moves towards a negative direction of the Y axis, the air gap between the left permanent-magnet magnetic pole 12 and the radial magnetic bearing rotor 18 and the air gap between the right permanent-magnet magnetic pole 13 and the radial magnetic bearing rotor 18 are increased, in order to make the radial magnetic bearing rotor 18 return to an original position anew, currents in opposite directions are introduced into the radial electromagnetic pole winding coil 1501 and the radial electromagnetic pole winding coil 1502, the radial electromagnetic pole 1401 and the radial electromagnetic pole 1402 jointly generate an electromagnetic pole magnetic flux 13, electromagnetic force generated by the electromagnetic pole magnetic flux 13 is forward and reverse along the Y axis, and the electromagnetic force and the bias force act together. Analysis of bias force and electromagnetic force in other directions is similar to the process, such that the compact structure may overcome external disturbance, keep the magnetic bearing rotor 18 at a set position, and achieve stable suspension of the radial magnetic bearing rotor 18.

Figure 4A:
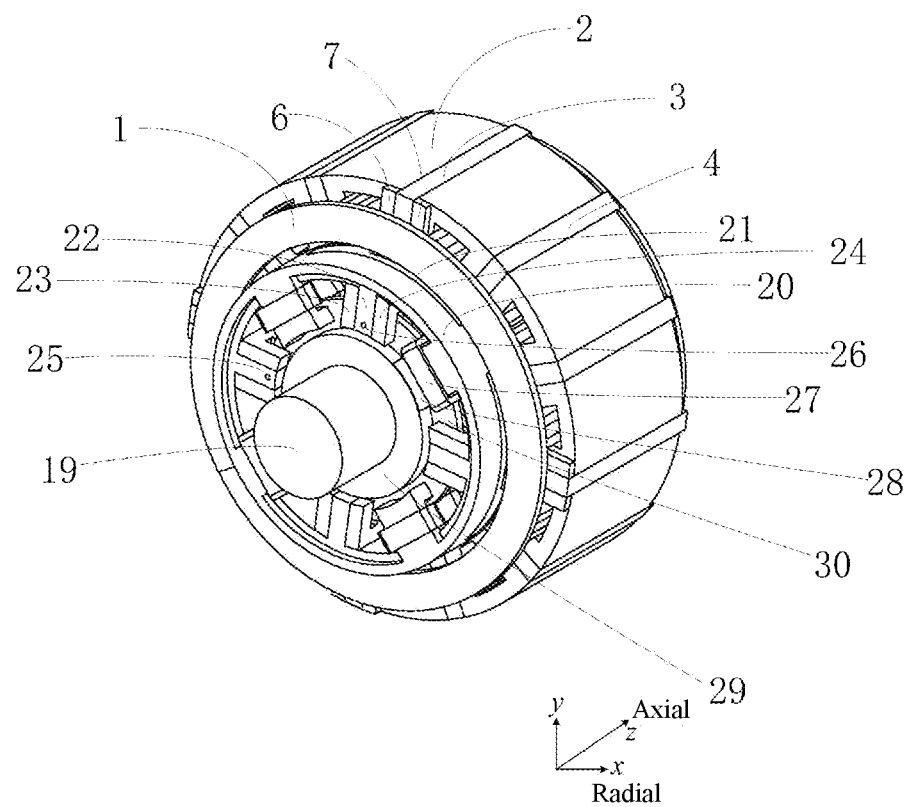
FIG. 4A is a structural diagram of a force-balancing axial magnetic bearing with an adjustable bias magnetic field for a stator permanent magnet motor mounted on the stator permanent magnet motor in Embodiment 2 of the present disclosure.
Figure 4B:
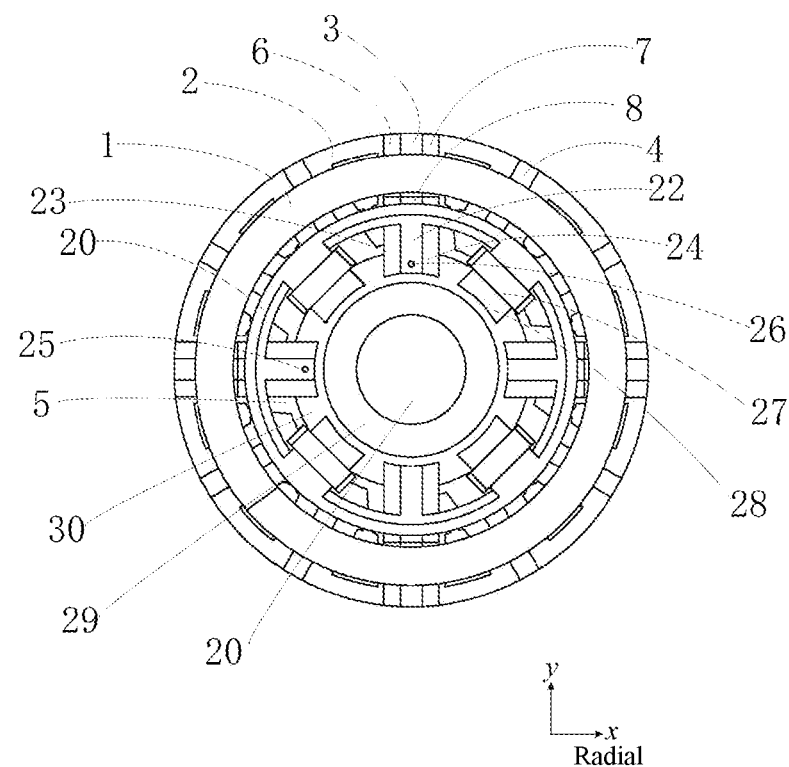
FIG. 4B is a front view of FIG. 4A.

Embodiment 2: Force-balancing axial magnetic bearing with adjustable bias magnetic field for stator permanent magnet motor As shown in FIGS. 4A and 4B, a force-balancing axial magnetic bearing with an adjustable bias magnetic field for a stator permanent magnet motor in Embodiment 2 of the present disclosure is mounted on a stator permanent magnet motor. A stator winding coil end 1, stator cores 2, a permanent magnet 3 axially longer than the stator cores, permanent magnets 4 axially equal to the stator cores, a motor rotor 5 and a motor rotating shaft 19 are basic components of the stator permanent magnet motor, and except for the permanent magnet 3 axially longer than the stator core, other components have dimensions, materials, and structures known to those skilled in the art. A structure of the stator permanent magnet motor is identical to that in Embodiment 1 and is not repeated herein.

Figure 5:
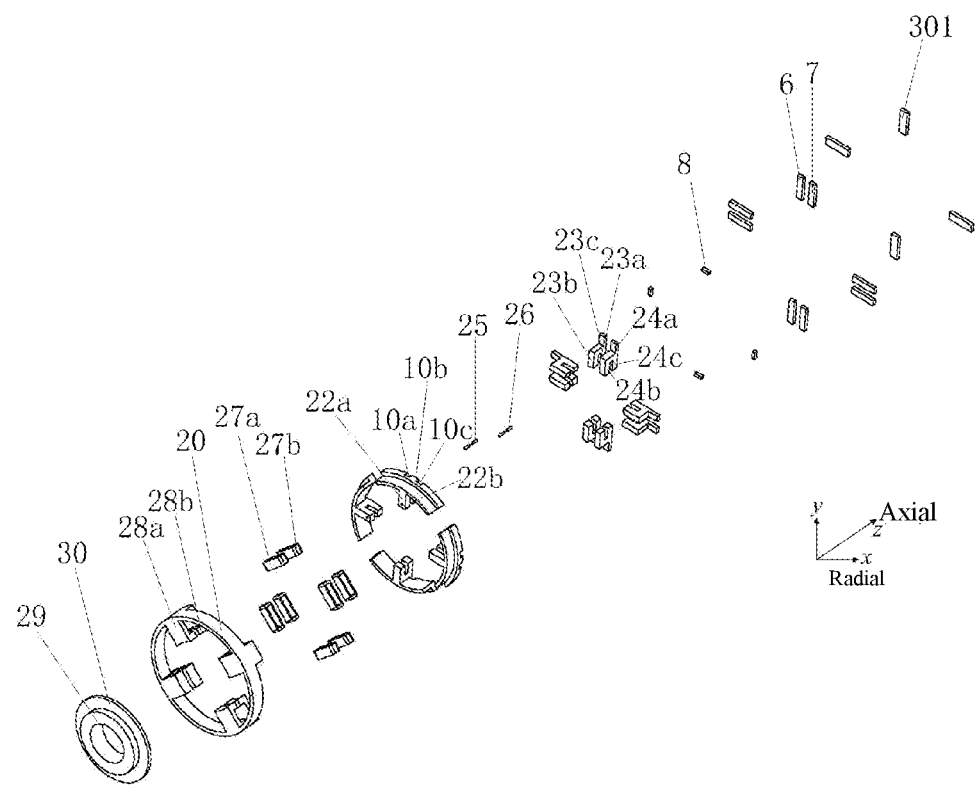
FIG. 5 is an exploded view of various components of the axial magnetic bearing in Embodiment 2 of the present disclosure.

What is different from Embodiment 1 is: permanent magnet sections axially longer than the stator cores, left permanent-magnet magnetic conduction members 6, right permanent-magnet magnetic conduction members 7, magnetic adjusting sections 8, an axial electromagnetic pole stator 20, an electromagnetic pole and permanent magnetic pole isolation plate 10, permanent-magnet two-side magnetic pole grooved connection sections, left permanent-magnet grooved magnetic poles 23, right permanent-magnet grooved magnetic poles 24, a first axial sensor 25, a second axial sensor 26, axial electromagnetic pole winding coils 27, axial electromagnetic poles 28, thrust disc reinforcing members 29 and a thrust disc 30 belong to the axial magnetic bearing, the axial magnetic bearing is wholly located on an inner side of a stator winding coil end 1 and keeps a certain distance from the motor rotor 5 in an axial direction, and an exploded view of the components is shown in FIG. 5.

The axial magnetic bearing is shown in FIG. 5, two sides of each permanent magnet section 301 axially longer than the stator cores are provided with a set of magnetic conduction members which are respectively a left permanent-magnet magnetic conduction member 6 and a right permanent-magnet magnetic conduction member 7, and axial lengths of the components are identical. Lower portions of the left permanent-magnet magnetic conduction members 6 and the right permanent-magnet magnetic conduction members 7 are connected to the left permanent-magnet grooved magnetic poles 23 and the right permanent-magnet grooved magnetic poles 24 respectively, all of which are all made of materials with desirable magnetic conductivity. The left permanent-magnet grooved magnetic poles 23 and the right permanent-magnet grooved magnetic poles 24 are each of a two-section structure and are provided with magnetic conduction sections 23a and magnetic conduction sections 24a as upper ends respectively, the magnetic conduction sections 23a and the magnetic conduction sections 24a are connected to the left permanent-magnet magnetic bridges 6 and the right permanent-magnet magnetic bridges 7, lower ends of the left permanent-magnet grooved magnetic poles and the right permanent-magnet grooved magnetic poles are provided with groove structures for the thrust disc 30 to be embedded in, and the grooves divide the left permanent-magnet grooved magnetic poles 23 and the right permanent-magnet grooved magnetic poles 24 into rear axial permanent magnetic poles 23b and 24b and front axial permanent magnetic poles 23c and 24c. One magnetic adjusting section 8 is arranged between the magnetic conduction sections 23a and 24a and is preferably made of magnetic conductive materials, and a bias magnetic field of the permanent magnetic poles is adjusted by adjusting the magnetic conductivity of the magnetic adjusting sections 8 or an embedded size of the magnetic conduction sections 23a and 24a. The permanent-magnet two-side magnetic pole grooved connection sections and the electromagnetic pole and permanent magnetic pole isolation plate 10 are an integral component and preferably made of materials which are non-magnetic-conductive, low in conductivity and certain in strength and hardness, one side, close to the magnetic conduction sections 23a and 24a, of the electromagnetic pole and permanent magnetic pole isolation plate 10 is provided with electromagnetic pole and permanent magnetic pole isolation plate recesses 10a, electromagnetic pole and permanent magnetic pole isolation plate recesses 10c, and electromagnetic pole and permanent magnetic pole isolation plate bosses 10b. Preferably, the electromagnetic pole and permanent magnetic pole isolation plate recesses 10a, the electromagnetic pole and permanent magnetic pole isolation plate recesses 10c and the magnetic conduction sections 23a and 24a have equal widths and depths, a radian distance of the electromagnetic pole and permanent magnetic pole isolation plate bosses 10b in a circumferential direction is equal to a distance between the magnetic conduction sections 23a and 24a, a front axial permanent-magnet two-side magnetic pole connector 22b and a rear axial permanent-magnet two-side magnetic pole connector 22a form a permanent-magnet two-side magnetic pole grooved connection section, the electromagnetic pole and permanent magnetic pole isolation plate recesses 10a, the electromagnetic pole and permanent magnetic pole isolation plate recesses 10c and the electromagnetic pole and permanent magnetic pole isolation plate bosses 10b are formed by grooving the front axial permanent-magnet two-side magnetic pole connectors 22b, the magnetic conduction sections 23a and 24a are embedded in the electromagnetic pole and permanent magnetic pole isolation plate recesses 10a and the electromagnetic pole and permanent magnetic pole isolation plate recesses 10c, and then the electromagnetic pole and permanent magnetic pole isolation plate bosses 10b are embedded between the magnetic conduction sections 23a and 24a. Meanwhile, the rear axial permanent-magnet two-side magnetic pole connectors 22a are embedded between the left permanent-magnet grooved magnetic poles 23 and the right permanent-magnet grooved magnetic poles 24 to form stable sandwich structures. By means of the above components and the preferable recess and boss structures, reliable connection between the components may be achieved. Four permanent-magnet two-side magnetic pole grooved connection sections are symmetrically distributed at an interval of 90°, a groove provided in each permanent-magnet two-side magnetic pole grooved connection section along a center is used for the thrust disc 30 to be arranged, and according to a principle of minimum reluctance, the rear axial permanent magnetic poles 23b and 24b and the thrust disc 30 form a closed path of the permanent magnetic flux, the front axial permanent magnetic poles 23c and 24c and the thrust disc 30 form a closed path of the permanent magnetic flux.

Two permanent-magnet two-side magnetic pole grooved connection sections are selected and the first axial sensor 25 and the second axial sensor 26 are implanted into lower portions of the rear axial permanent-magnet two-side magnetic pole connector 22a and the front axial permanent-magnet two-side magnetic pole connector 22b, the first axial sensor 25 (or the second axial sensor 26) includes two sensors to detect axial displacement or distance of the thrust disc 30 respectively, the first axial sensor 25 and the second axial sensor 26 form a fault-tolerant set, and axial displacement or distance detection errors caused by local deformation of the thrust disc or failure of part of the sensors are prevented. The first axial sensor 25 and the second axial sensor 26 are in the prior art or products in the prior art.

The axial electromagnetic pole stator 20 and the axial electromagnetic poles 28 are integrated and made of materials with desirable magnetic conductivity, and the four axial electromagnetic poles 28 are symmetrically distributed at an interval of 90°. A groove is provided in each axial electromagnetic pole 28 along a center position, the thrust disc 30 is arranged in the grooves, each groove divides the corresponding axial electromagnetic pole 28 into two magnetic poles, that is, a rear axial electromagnetic pole 28a and a front axial electromagnetic pole 28b, and an axial electromagnetic pole winding coil 27b and an axial electromagnetic pole winding coil 27a are wound around the rear axial electromagnetic pole 28a and the front axial electromagnetic pole 28b respectively.

It can be seen that four axial electromagnetic poles 28 form an electromagnetic pole of the axial force and bias force-balancing axial magnetic bearing of a stator permanent magnet motor, four permanent magnet sections axially longer than the stator cores and the magnetic bridges thereof, the magnetic adjusting sections 8, the permanent-magnet two-side magnetic pole grooved connection sections 22, the left permanent-magnet grooved magnetic poles 23 and the right permanent-magnet grooved magnetic poles 24 form the permanent magnetic pole, the axial magnetic bearing is of an eight-pole structure, the eight magnetic poles are evenly distributed at an interval of 45°, and lower ends of the eight magnetic poles are arc surfaces.

Figure 6:
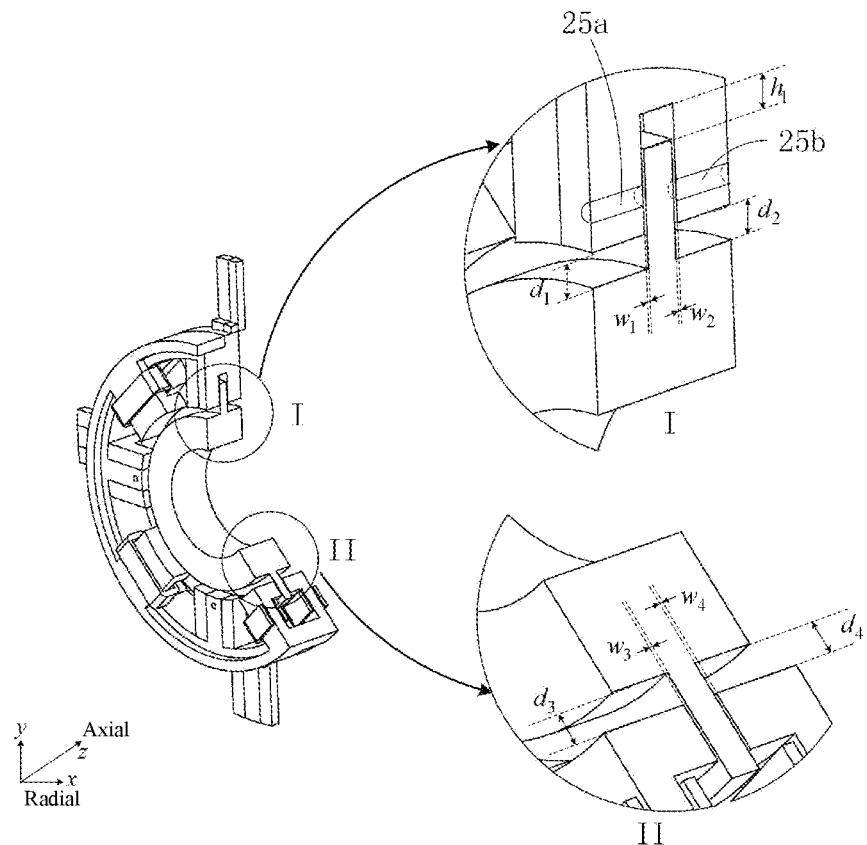
FIG. 6 is a partial sectional view and an enlarged partial view of the axial magnetic bearing in Embodiment 2 of the present disclosure.

As shown in FIG. 6, as for the permanent magnetic pole, preferably, a length d1 of a rear air gap between the permanent magnetic pole and a thrust disc reinforcing member is equal to a length d2 of a front air gap between the permanent magnetic pole and the thrust disc reinforcing member, that is, d1=d2; and a length w1 of a rear air gap between the permanent magnetic pole and a thrust disc and a length w2 of a front air gap between the permanent magnetic pole and the thrust disc are set as adjustable values for bias force adjustment.

As for the axial electromagnetic pole, preferably, a length d3 of a rear air gap between the axial electromagnetic pole and the thrust disc reinforcing member is equal to a length d4 of a front air gap between the axial electromagnetic pole and the thrust disc reinforcing member, that is, d3=d4; a length w3 of a rear air gap between the axial electromagnetic pole and the thrust disc is equal to d1, that is, w3=d1; and a length w4 of a front air gap between the axial electromagnetic pole and the thrust disc is equal to d2, that is, w4=d2.

Preferably, d1»w1, or d1»w2, and a length h1 of a rear air gap between the permanent magnetic pole and the thrust disc=d1.

The thrust disc 30 and the two thrust disc reinforcing members 29 arranged on two sides are all of annular structures, the two thrust disc reinforcing members 29 may fasten the thrust disc 30, the thrust disc 30 has an outer diameter larger than that of the thrust disc reinforcing members 29 and an inner diameter equal to that of the thrust disc reinforcing member and further equal to an outer diameter of a motor rotating shaft 19.

Preferably, the thrust disc 30 and the thrust disc reinforcing members 29 are made of silicon steel sheets and other materials with desirable magnetic conductivity and low conductivity and may serve as independent components or an integral component. Under the condition that the thrust disc 30 has an outer diameter smaller than the outer diameter of the motor rotating shaft 19 and a larger axial length, the thrust disc reinforcing member 29 may be omitted.

Figure 7A:
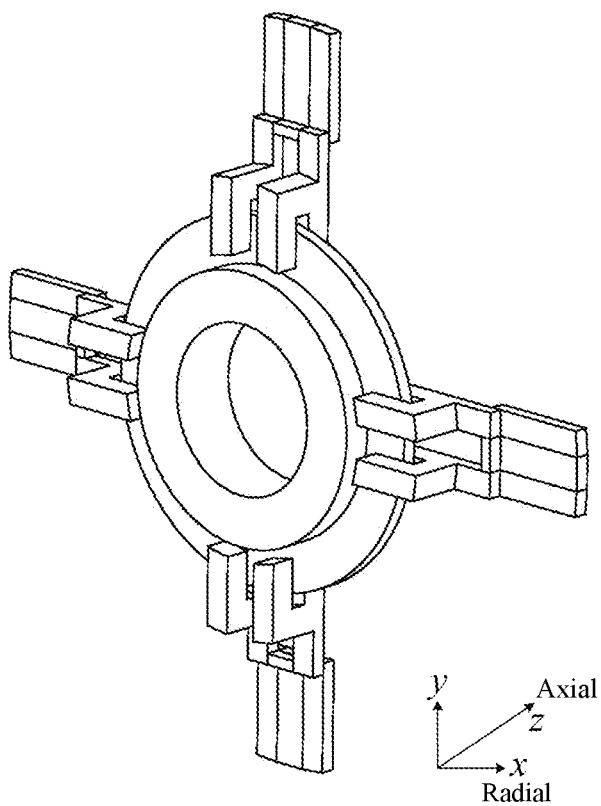
FIG. 7A is a schematic diagram of a permanent magnet bias pole of the axial magnetic bearing in Embodiment 2 of the present disclosure.
Figure 7B:
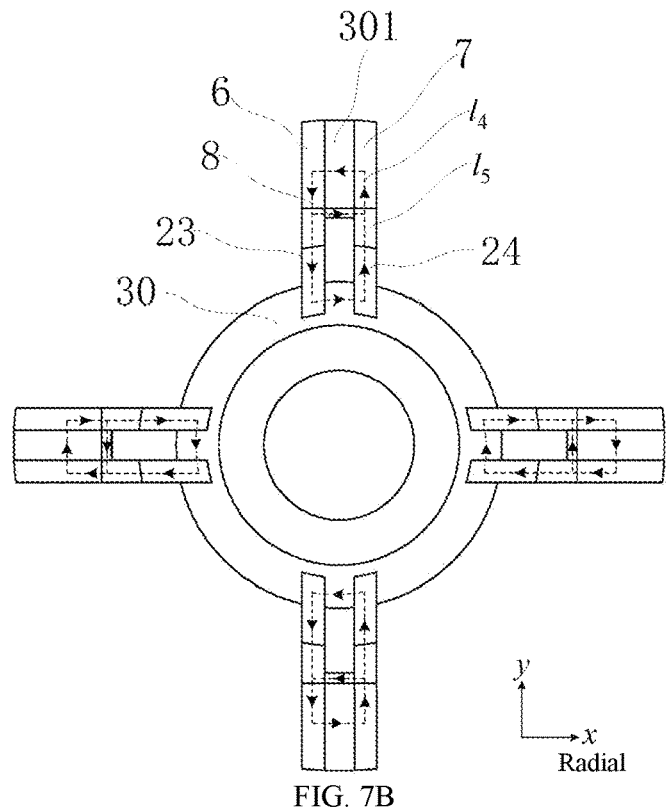
FIGS. 7B and 7C are a front view and a side view of a permanent magnet bias magnetic pole magnetic flux respectively.
Figure 7C:
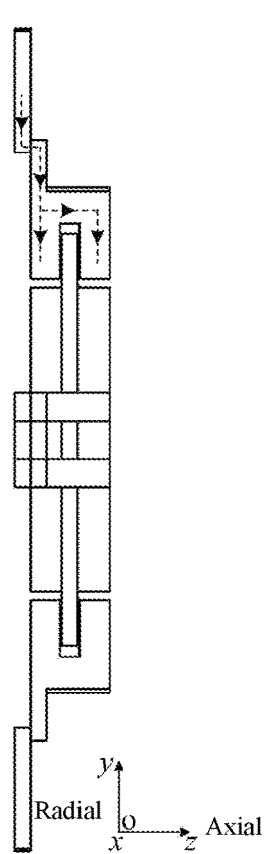

FIG. 7A is a schematic diagram of a permanent magnet bias magnetic pole and magnetic flux of the axial magnetic bearing in Embodiment 2 of the present disclosure. As shown in FIG. 7B, a permanent magnetic pole magnetic flux 14 passes through the permanent magnet section 301 axially longer than the stator cores, the left permanent-magnet magnetic bridge 6, the magnetic adjusting section 8 and the right permanent-magnet magnetic bridge 7 to form a loop, and the magnetic flux does not pass through the thrust disc 30. As shown in FIGS. 7B and 7C, a permanent magnetic pole magnetic flux 15 passes through the permanent magnet section 301 axially longer than the stator cores, the left permanent-magnet magnetic bridge 6, the left permanent-magnet grooved magnetic pole 23, the thrust disc 30, the right permanent-magnet grooved magnetic pole 24 and the right permanent-magnet magnetic bridge 7 to form a loop, the magnetic flux passes through the thrust disc 30, and more specifically, the permanent magnetic pole magnetic flux is divided into two branches of magnetic flux, where one path passes through the rear axial permanent magnetic poles 23b and 24b, and the other path passes through the front axial permanent magnetic poles 23c and 24c.

Obviously, by adjusting the magnetic conductivity of the magnetic adjusting sections 8 or the embedded size of the magnetic conduction sections 23a and 24a, the magnitude of the permanent magnetic pole magnetic flux 14 and the permanent magnetic pole magnetic flux 15 may be changed; and the length w1 of the rear air gap between the permanent magnetic pole and the thrust disc and the length w2 of the front air gap between the permanent magnetic pole and the thrust disc are adjusted by changing a position of the thrust disc mounted on the motor rotating shaft, and the magnitude of the axial bias force is determined by the magnitude of two branch magnetic fluxes of the permanent magnetic pole magnetic flux 14.

Figure 8A:
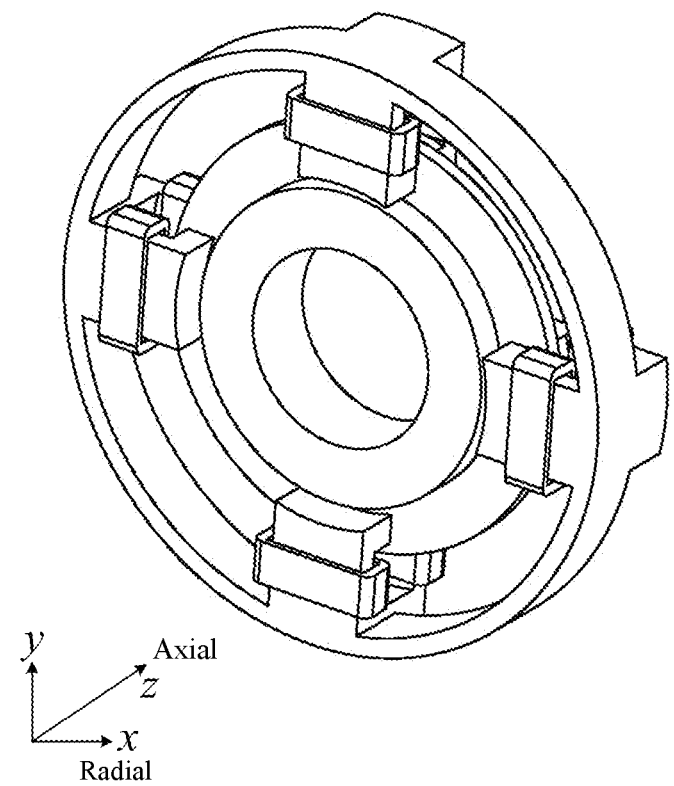
FIG. 8A is a schematic diagram of an electromagnetic pole of the axial magnetic bearing in Embodiment 2 of the present disclosure.
Figure 8B:
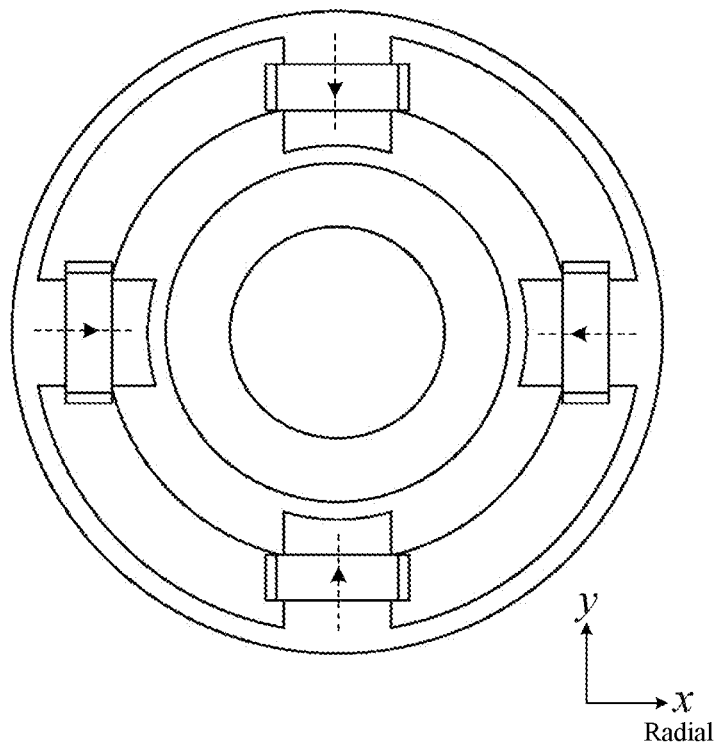
FIGS. 8B and 8C are a front view and a sectional view of an electromagnetic pole magnetic flux respectively.
Figure 8C:
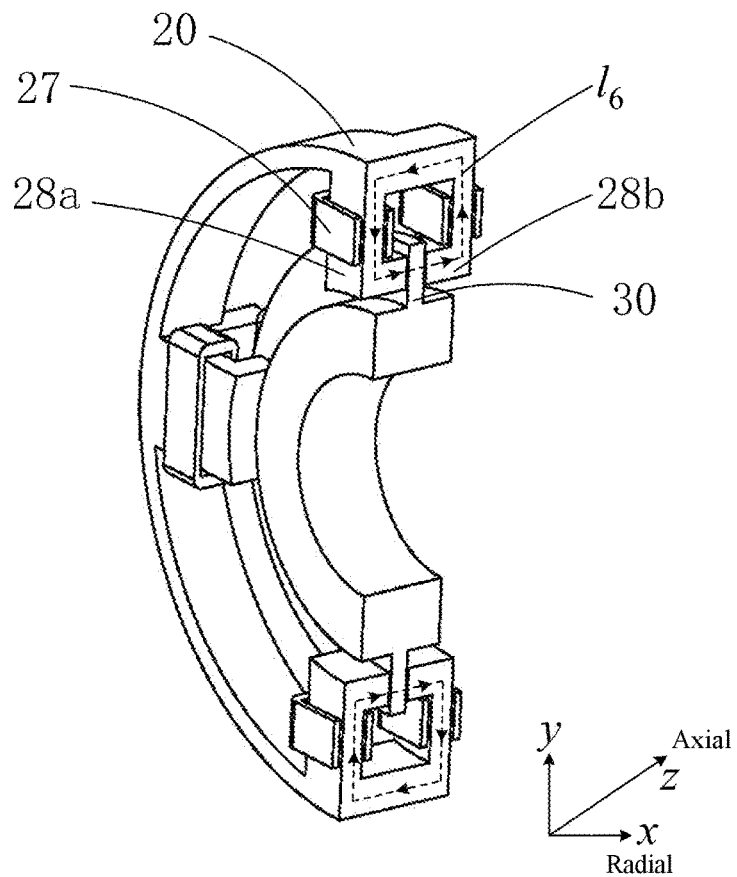

FIGS. 8A, 8B and 8C are schematic diagrams of an electromagnetic pole and a magnetic flux loop of the axial force and bias force-balancing axial magnetic bearing of a stator permanent magnet motor. When currents are introduced into the axial electromagnetic pole winding coils 27, an axial electromagnetic pole magnetic flux 16 passes through the rear axial electromagnetic pole 28a, the thrust disc 30, the front axial electromagnetic pole 28b and the axial electromagnetic pole stator 20 to form a loop.

With further reference to FIGS. 7A-7C and 8A-8C, it can be seen that the permanent magnetic pole magnetic flux and the axial electromagnetic pole magnetic flux flow through different paths, and decoupling isolation of the permanent magnetic pole magnetic flux and the electromagnetic pole magnetic flux is achieved by means of the electromagnetic pole and permanent magnetic pole isolation plate 10, such that the two magnetic fluxes have the advantages of being low in coupling degree and beneficial to control.

Figure 9:
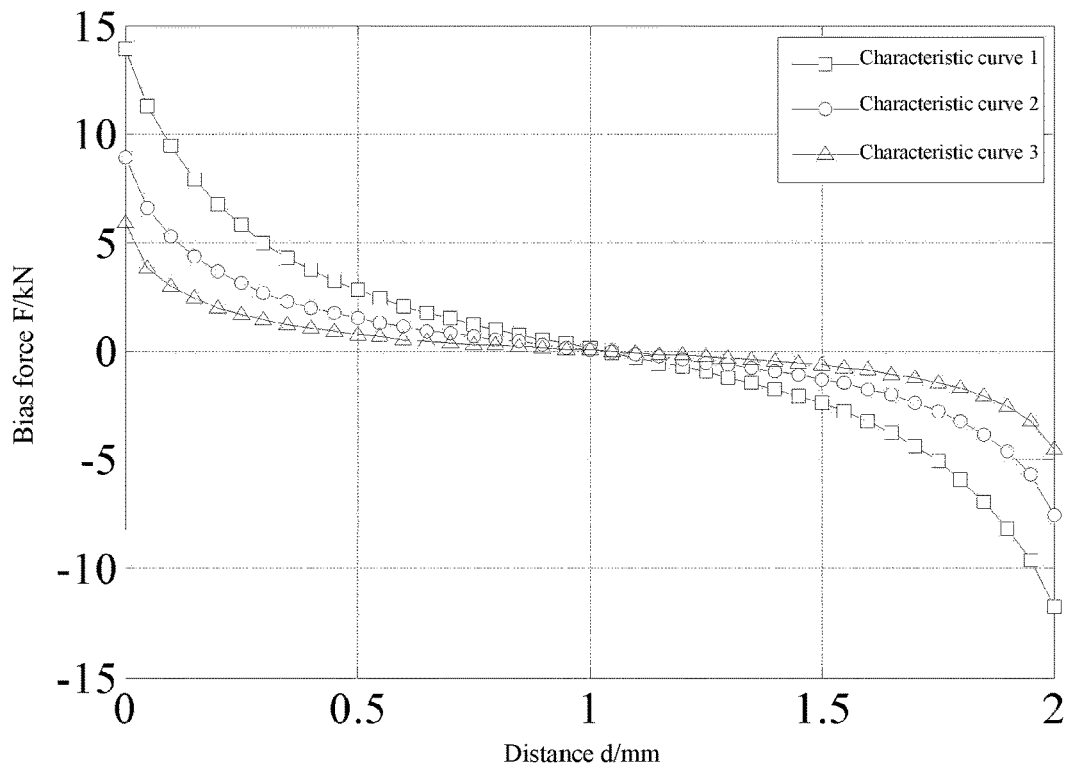
FIG. 9 is a relation diagram of bias force and distance d obtained in Embodiment 2 of the present disclosure.

In conjunction with FIGS. 6 and 9, a basic principle for balancing axial force and bias force when Embodiment 2 is used in a device with the axial force is described in detail. According to the analysis, the magnetic adjusting sections 8 may change the magnitude of the permanent magnetic pole magnetic flux 14 and the magnitude of the permanent magnetic pole magnetic flux 15, the air gap lengths w1 and w2 may be used for adjusting the magnitude of two branch magnetic fluxes of the permanent magnetic pole magnetic flux, and the magnitude of the branch magnetic fluxes may determine the bias force of the axial magnetic bearing. In FIG. 9, an abscissa d (unit: mm) represents a distance from the thrust disc 30 to the rear axial permanent magnetic poles 23b and 24b (or the front axial permanent magnetic poles 23c and 24c), an ordinate represents the magnitude of the bias force F (unit: kN), and characteristic curves 1, 2, 3 are the bias force characteristic curves when the magnetic adjusting sections 8 are adjusted. The characteristic curve 1 represents the bias force when the magnetic conductivity of the magnetic adjusting sections 8 is zero (or the embedded size of the magnetic conduction sections 23a and 24a is zero), the characteristic curve 2 represents the bias force when the magnetic conductivity of the magnetic adjusting sections 8 is increased to be equal to that of the magnetic conduction sections 23a and 24a and the embedded size of the magnetic conduction sections 23a and 24a is one third of that of the magnetic conduction sections, and the characteristic curve 3 represents the bias force when the magnetic conductivity of the magnetic adjusting sections 8 is increased to be equal to that of the magnetic conduction sections 23a and 24a and the embedded size of the magnetic conduction sections 12a and 13a is half of that of the magnetic conduction sections. Obviously, by changing the magnetic conductivity of the magnetic adjusting sections 8 and the embedded size of the magnetic conduction sections 23a and 24a, a cluster of bias force characteristic curves may be obtained.

Without loss of generality, d is set to range from 0 mm to 2 mm. It can be seen that the bias force presents a regular distribution trend with different d or adjustment of the magnetic adjusting sections 8: (1) when a distance between the thrust disc 30 and the rear axial permanent magnetic poles 23b and 24b (or the front axial permanent magnetic poles 23c and 24c) is smaller, that is, d≈0 (or d≈2), an absolute value of the bias force F is larger; (2) the absolute values of a maximum value and a minimum value of the bias force F are not equal due to different reluctances of two branches of the permanent magnetic pole magnetic flux; (3) when the thrust disc 30 is located at the center of the rear axial permanent magnetic poles 23b and 24b and the front axial permanent magnetic poles 23c and 24c, that is, d=1, the bias force is not equal to zero, the magnitude of the bias force depends on a difference of the reluctances of the two branches, and the larger the difference is, the larger the absolute value of the bias force is; and (4) plus and minus signs of the bias force indicate the directions of the bias force.

According to the distribution features, when the axial force and bias force-balancing axial magnetic bearing of a stator permanent magnet motor is used for an apparatus, with axial force, for example, a centrifugal fan, a centrifugal impeller, etc. in the background technology, the stator permanent magnet motor serves as a power motor, the axial force of the apparatus during operation may be computed according to a working mode, a load feature, a rotation direction and a mounting mode of the apparatus, then the bias force most suitable for the working mode, the load feature, the rotation direction and the mounted mode is selected by looking up a bias force characteristic curve cluster similar to that in FIG. FIG. 9, then, a magnetic conductivity of the magnetic adjusting sections, an embedded size of the magnetic conduction sections and relative distances between the thrust disc and the front permanent magnetic pole and between the thrust disc and the rear permanent magnetic pole are adjusted according to the bias force, so as to generate the selected bias force, the bias force is balanced with the axial force generated during operation without the bias force, and magnetic field potential of the permanent magnetic poles is exerted to the maximum extent. When the bias force is not enough to balance the axial force, currents are introduced into the electromagnetic pole coils, and electromagnetic force and the bias force of the permanent magnetic poles act together to balance the axial force. During actual operation, when an axial position deviates from a balance position, external disturbance may be overcome only by controlling the magnitude of the currents in the rear axial electromagnetic poles 28a and the front axial electromagnetic poles 28b, and the thrust disc 30 is kept at a set position, such that stability of the thrust disc 30 of the magnetic bearing is achieved.

In the description of the present disclosure, the terms, "front", "rear", "left", "right", "inner", "outer", "upper", "lower", etc. indicate azimuthal or positional relations based on those shown in the drawings only for ease of description of the present disclosure, and are not intended to indicate or imply that the referenced device or element must have a particular orientation, and thus may not be construed as a limitation on the present disclosure.

The above description is not intended to limit the present disclosure, as long as the magnetic field energy of the permanent magnets of the stator permanent magnet motor is introduced into the radial magnetic bearing, any modifications, equivalent replacements, improvements, etc. made within the spirit and principles of the present disclosure, for example, the number of stator permanent magnets is modified to be other reasonable numbers, or the number of permanent magnet bias magnetic poles are set to be one, two and three, should fall within the scope of protection of the present disclosure.

In addition, it should be noted that in order to facilitate the description of the present disclosure and help those skilled in the art to understand the specific embodiment of the present disclosure, only a stator, a rotor and a magnetic bearing of a stator permanent magnet motor are given in the accompanying drawings, parts and structures of a motor housing, a motor end cover, a mechanical protection bearing, a cooling structure, etc. which are necessary for constituting such products as the magnetic bearing motor are not mentioned, but the above are not intended to limit the present disclosure, and typical features of such products are emphatically and clearly given. As long as the magnetic field energy of the permanent magnets of the stator permanent magnet motor is introduced into the magnetic bearing and a bias magnetic flux is generated by means of introduced permanent magnet energy, any modification, equivalent replacement, improvement, etc. made within the spirit and principles of the present disclosure, for example, the number of stator permanent magnets is modified into other reasonable numbers, or the axial magnetic bearing in the present disclosure is modified into an axial and radial hybrid magnetic bearing by adjusting d1, d2, d3, d4, w1, w2, w3, w4 and h1, should fall within the scope of protection of the present disclosure.

The above description of the disclosed embodiments make those skilled in the art implement or use the present disclosure. Various modifications to these embodiments will be readily apparent to those skilled in the art, and generic principles defined herein may be implemented in other embodiments without departing from the spirit or scope of the present disclosure. Thus, the present disclosure is not to be limited to the embodiments shown herein but is to be accorded the widest scope consistent with the principles and novel features disclosed herein.

What is claimed is:

1. A force-balancing magnetic bearing with an adjustable bias magnetic field for a stator permanent magnet motor, comprising:
a magnetic suspension bearing rotor, an electromagnetic pole stator, an electromagnetic pole and permanent magnetic pole isolation plate, permanent-magnet two-side magnetic pole connection sections, left permanent-magnet magnetic poles, right permanent-magnet magnetic poles, magnetic adjusting sections, left magnetic bridges and right magnetic bridges, wherein
the magnetic suspension bearing rotor is assembled on a motor rotating shaft,
the permanent-magnet two-side magnetic pole connection sections are assembled on a back side of the electromagnetic pole and permanent magnetic pole isolation plate and embedded between adjacent electromagnetic pole stators,
the electromagnetic pole and permanent magnetic pole isolation plate is provided with recesses for the left permanent-magnet magnetic poles and the right permanent-magnet magnetic poles to be embedded therein,
the left permanent-magnet magnetic poles and the right permanent-magnet magnetic poles are assembled on the electromagnetic pole and permanent magnetic pole isolation plate to clamp the permanent-magnet two-side magnetic pole connection sections,
the magnetic adjusting sections are assembled between the left permanent-magnet magnetic poles and the right permanent-magnet magnetic poles,
the left magnetic bridges are attached to the left permanent-magnet magnetic poles, the right magnetic bridges are attached to the right permanent-magnet magnetic poles, and the left magnetic bridges and the right magnetic bridges clamping two sides of permanent magnet sections extending out of a core,
the electromagnetic pole and permanent magnetic pole isolation plate, the permanent-magnet two-side magnetic pole connection sections, the left permanent-magnet magnetic poles, the right permanent-magnet magnetic poles and the magnetic adjusting sections form a bias magnetic circuit of the permanent magnet sections extending out of the core.

2. The force-balancing magnetic bearing with the adjustable bias magnetic field for the stator permanent magnet motor according to claim 1, wherein the electromagnetic pole and permanent magnetic pole isolation plate and the permanent-magnet two-side magnetic pole connection sections are an integrally formed component, an axial front side of the integrally formed component is provided with recesses for the left permanent-magnet magnetic pole and the right permanent-magnet magnetic pole to be embedded therein, and an axial rear side of the integrally formed component is of a T-shaped structure with a radian matching a radian distance between the adjacent electromagnetic pole stators.

3. The force-balancing magnetic bearing with the adjustable bias magnetic field for the stator permanent magnet motor according to claim 2, wherein when the force-balancing magnetic bearing of the stator permanent magnet motor is a radial magnetic bearing, radial coils are wound around the electromagnetic pole stator, the left permanent-magnet magnetic pole and the right permanent-magnet magnetic pole are both permanent magnetic poles provided with upper magnetic conduction sections and lower clamping sections, and radial sensors are mounted on the permanent-magnet two-side magnetic pole connection sections.

4. The force-balancing magnetic bearing with the adjustable bias magnetic field for the stator permanent magnet motor according to claim 2, wherein when the magnetic bearing of the stator permanent magnet motor is an axial magnetic bearing, grooves for a thrust disc to be embedded therein are provided in the electromagnetic pole stator, an axial coil is wound around each electromagnetic pole stator, the left permanent-magnet magnetic pole and the right permanent-magnet magnetic pole are both permanent magnetic poles provided with upper magnetic conduction sections and lower clamping sections, the grooves for the thrust disc to be embedded therein is provided in the lower clamping sections, and axial sensors are mounted on the permanent-magnet two-side magnetic pole connection sections.

5. The force-balancing magnetic bearing with the adjustable bias magnetic field for the stator permanent magnet motor according to claim 1, wherein recesses for electromagnetic pole stator bosses to be embedded therein are reserved between two adjacent permanent-magnet two-side magnetic pole connection sections.

6. The force-balancing magnetic bearing with the adjustable bias magnetic field for the stator permanent magnet motor according to claim 5, wherein when the force-balancing magnetic bearing of the stator permanent magnet motor is a radial magnetic bearing, radial coils are wound around the electromagnetic pole stator, the left permanent-magnet magnetic pole and the right permanent-magnet magnetic pole are both permanent magnetic poles provided with upper magnetic conduction sections and lower clamping sections, and radial sensors are mounted on the permanent-magnet two-side magnetic pole connection sections.

7. The force-balancing magnetic bearing with the adjustable bias magnetic field for the stator permanent magnet motor according to claim 5, wherein when the magnetic bearing of the stator permanent magnet motor is an axial magnetic bearing, grooves for a thrust disc to be embedded therein are provided in the electromagnetic pole stator, an axial coil is wound around each electromagnetic pole stator, the left permanent-magnet magnetic pole and the right permanent-magnet magnetic pole are both permanent magnetic poles provided with upper magnetic conduction sections and lower clamping sections, the grooves for the thrust disc to be embedded therein is provided in the lower clamping sections, and axial sensors are mounted on the permanent-magnet two-side magnetic pole connection sections.

8. The force-balancing magnetic bearing with the adjustable bias magnetic field for the stator permanent magnet motor according to claim 1, wherein when the force-balancing magnetic bearing of the stator permanent magnet motor is a radial magnetic bearing, radial coils are wound around the electromagnetic pole stator, the left permanent-magnet magnetic pole and the right permanent-magnet magnetic pole are both permanent magnetic poles provided with upper magnetic conduction sections and lower clamping sections, and radial sensors are mounted on the permanent-magnet two-side magnetic pole connection sections.

9. A method for controlling a stable suspension of a rotor of the force-balancing magnetic bearing with the adjustable bias magnetic field for the stator permanent magnet motor according to claim 8, wherein with respect to the permanent magnet sections extending out of the core and generating a bias force, a size of portions, embedded in the left permanent-magnet magnetic pole and the right permanent-magnet magnetic pole, of the magnetic adjusting sections is adjusted so as to adjust the bias force, and currents in opposite directions are applied to portions, on two sides of the permanent-magnet two-side magnetic pole connection sections in bias magnetic circuits of the permanent magnet sections, of the electromagnetic pole stator so as to adjust an electromagnetic force.

10. The force-balancing magnetic bearing with the adjustable bias magnetic field for the stator permanent magnet motor according to claim 1, wherein when the magnetic bearing of the stator permanent magnet motor is an axial magnetic bearing, grooves for a thrust disc to be embedded therein are provided in the electromagnetic pole stator, an axial coil is wound around each electromagnetic pole stator, the left permanent-magnet magnetic pole and the right permanent-magnet magnetic pole are both permanent magnetic poles provided with upper magnetic conduction sections and lower clamping sections, the grooves for the thrust disc to be embedded therein is provided in the lower clamping sections, and axial sensors are mounted on the permanent-magnet two-side magnetic pole connection sections.

11. The force-balancing magnetic bearing with the adjustable bias magnetic field for the stator permanent magnet motor according to claim 10, wherein a length $d1$ of a rear air gap between the left permanent-magnet magnetic pole and a thrust disc reinforcing member is equal to a length $d2$ of a front air gap between the left permanent-magnet magnetic pole and the thrust disc reinforcing member, a length $d3$ of a rear air gap between the electromagnetic pole stator and the thrust disc reinforcing member is equal to a length $d4$ of a front air gap between the electromagnetic pole stator and the thrust disc reinforcing member, a length $w3$ of a rear air gap between the electromagnetic pole stator and the thrust disc is equal to the length $d1$ of the rear air gap between the left permanent-magnet magnetic pole and the thrust disc reinforcing member, and a length $w4$ of a front air gap between the electromagnetic pole stator and the thrust disc is equal to the length $d2$ of the front air gap between the left permanent-magnet magnetic pole and the thrust disc reinforcing member.

12. The force-balancing magnetic bearing with the adjustable bias magnetic field for the stator permanent magnet motor according to claim 11, wherein $d1 \gg w1$ or $d1 \gg w2$, a length $h1$ of a rear air gap between the left permanent-magnet magnetic pole and the thrust disc is equal to the length $d1$ of the rear air gap between the left permanent-magnet magnetic pole and the thrust disc reinforcing member.

13. A method for adjusting a bias force of the force-balancing magnetic bearing with the adjustable bias magnetic field for the stator permanent magnet motor according to claim 10, wherein a length $w1$ of a rear air gap between the left permanent-magnet magnetic pole and the thrust disc and a length $w2$ of a front air gap between the left permanent-magnet magnetic pole and the thrust disc are changed by adjusting a position for mounting the thrust disc on the motor rotating shaft.

* * * * *